(12) United States Patent
Gunn et al.

(10) Patent No.: US 9,307,743 B2
(45) Date of Patent: Apr. 12, 2016

(54) ANIMAL TRANSPORT WATERING METHOD

(71) Applicant: John L. Gunn Trust, Waterford, MI (US)

(72) Inventors: Randall Scott Gunn, Fort Collins, CO (US); Randy DeVaney, Larkspur, CO (US)

(73) Assignee: John L. Gunn Trust, Springfield, MO (US)

( * ) Notice: Subject to any disclaimer, the term of this patent is extended or adjusted under 35 U.S.C. 154(b) by 133 days.

(21) Appl. No.: 14/075,967

(22) Filed: Nov. 8, 2013

(65) Prior Publication Data

US 2014/0305377 A1 Oct. 16, 2014

Related U.S. Application Data (62) Division of application No. 12/860,805, filed on Aug. 20, 2010, now Pat. No. 8,596,221.

(51) Int. Cl.
| | | |
|---|---|---|
| *B61D 49/00* | (2006.01) | |
| *A01K 7/00* | (2006.01) | |
| *A01K 7/06* | (2006.01) | |
| *B60P 3/04* | (2006.01) | |

(52) U.S. Cl.
CPC ... *A01K 7/00* (2013.01); *A01K 7/06* (2013.01); *B60P 3/04* (2013.01); *Y10T 137/0318* (2015.04); *Y10T 137/794* (2015.04); *Y10T 137/8158* (2015.04); *Y10T 137/8593* (2015.04); *Y10T 137/85978* (2015.04)

(58) Field of Classification Search
CPC .......... B61D 3/163; B61D 49/00; A01K 7/00; A01K 7/06; A01K 7/022; A01K 7/025; A01K 5/0107; B60P 3/04; Y10T 137/794; Y10T 137/8158; Y10T 137/8593; Y10T 137/85978
USPC .................................................. 119/408, 409
See application file for complete search history.

(56) References Cited

U.S. PATENT DOCUMENTS

| | | |
|---|---|---|
| 2,713,322 A | 7/1955 | Coyner |
| 3,776,192 A | 12/1973 | Stamps et al. |
| 3,943,890 A | 3/1976 | Calia |

(Continued)

FOREIGN PATENT DOCUMENTS

| | | | | |
|---|---|---|---|---|
| DE | 202004015158 | * | 3/2006 | ............... B60P 3/04 |
| WO | WO 9854027 A2 | * | 12/1998 | ............... B60P 3/04 |
| WO | 2007144094 | | 12/2007 | |

OTHER PUBLICATIONS

International Search Report for PCT/US2010/046242, International Searching Authority, Nov. 16, 2010, pp. 1-17.

*Primary Examiner* — Joshua Huson
(74) *Attorney, Agent, or Firm* — Paul M. Thompson; Cochran Freund & Young, LLC (57) ABSTRACT

Disclosed is a method and device for providing water to livestock during transport in a trailer that is being towed behind a vehicle. In the disclosed embodiments, each stall of the trailer is equipped with one or more transferable animal transport watering assemblies that allows each animal to have their own on-demand access to water. Each watering assembly is releasably mounted with a quick release bracket and quick-connect pressurized water supply, facilitating easy transfer of the watering assembly to an external mount point on the trailer so that the animals have continued access to the water supply when the trailer is parked.

5 Claims, 6 Drawing Sheets

(56) References Cited

U.S. PATENT DOCUMENTS

| | | |
|---|---|---|
| 4,123,991 A | 11/1978 | Kinrade |
| 4,153,011 A | 5/1979 | Weissman et al. |
| 4,159,142 A | 6/1979 | Larson |
| 4,456,149 A | 6/1984 | Sciortino |
| 5,209,184 A | 5/1993 | Sharkan et al. |
| 5,361,929 A | 11/1994 | McLain et al. |
| 5,518,613 A | 5/1996 | Koczur et al. |
| 5,738,037 A | 4/1998 | Mahan |
| 5,809,934 A | 9/1998 | Gavet |
| 5,817,231 A | 10/1998 | Souza |
| 6,279,508 B1 | 8/2001 | Marchant et al. |
| 7,243,611 B2 | 7/2007 | Schumacher et al. |
| 2003/0233987 A1 | 12/2003 | May |
| 2006/0070661 A1 | 4/2006 | Wheeler |
| 2007/0102957 A1 | 5/2007 | Alfstad-Seibel et al. |

\* cited by examiner

ANIMAL TRANSPORT WATERING METHOD

CROSS REFERENCE TO RELATED APPLICATIONS

This application is a Divisional of prior U.S. application Ser. No. 12/860,805, entitled "Animal Transport Watering System and Method", filed on Aug. 20, 2010, the entire disclosure of which is hereby specifically incorporated by reference for all that it discloses andteaches.

BACKGROUND OF THE INVENTION

Transportation of animals over distances is inherently problematic from the aspect that basic needs of the animals are often neglected because of the logistical difficulties involved. In particular, transporting livestock by trailer, whether towed by automobile, truck or semi-tractor over long distances can result in stress to the animals and can be particularly detrimental if food and water are not readily provided. More specifically, horses are often transported with an expectation of performing upon arrival at a destination, and therefore, must be in immediate peak condition. Whereas food may readily be provided during this transport, currently the needs of the animals are not being met when it comes to the supply of water that is necessary to maintain proper health and performance.

SUMMARY OF THE INVENTION

An embodiment of the present invention may therefore comprise an animal transport watering system in combination with a trailer that is towable behind a vehicle comprising: at least one animal stall capable of housing at least one animal to be transported; a liquid reservoir that stores water for consumption by the animal; a pump that distributes pressurized water from the liquid reservoir to a plurality of water distribution sites wherein the water distribution sites are both inside and outside of the trailer, each water distribution site in fluid communication with a pressurized water distribution network via individual supply lines; a releasable valved connection at the distal terminus of each individual supply line that facilitates a connection, and allows fluid communication to a watering assembly when the valved connection is connected, and prevents flow when the watering assembly is not connected, each water distribution site comprising a bracket and the releasable valved connection; the watering assembly comprising: a connector that facilitates a pressurized connection between the releasable valved connection and a supply hose, the supply hose in fluid communication with an animal activated dispensing valve; a basin that receives and retains the water that is dispensed by the dispensing valve and facilitates drinking by the animal; a splash resistant lip on the basin that restricts liquid from splashing out of the basin; and, a hanger that facilitates a releasable connection between the watering assembly and the bracket mounted on a support structure associated with the trailer.

An embodiment of the present invention may also comprise a method of providing water to livestock transported in a trailer that can be towed behind a vehicle comprising: storing water for livestock consumption within a liquid reservoir; pumping the water from the liquid reservoir through a pressurized water distribution network to a plurality of water distribution sites via a plurality of individual supply lines; providing pressurized water at releasable valved connections at the distal terminus of each individual supply line, allowing flow of water through the releasable valved connection when a watering assembly is connected to the releasable valved connection, and preventing flow of water through the releasable valved connection when the watering assembly is not connected to the releasable valved connection; connecting a watering assembly to at least one releasable valved connection to at least one water distribution site with a hanger that facilitates a releasable connection between the watering assembly and a first bracket mounted on an internal support structure located within the confines of the trailer; transporting the livestock and the liquid reservoir filled with the water with the trailer; connecting a watering assembly to at least one releasable valved connection to at least one water distribution site located outside of the confines of the trailer with a hanger that facilitates a releasable connection between the watering assembly and a second bracket mounted on an external support structure associated with the trailer; providing pressurized water at an animal activated dispensing valve in the watering assembly located within the trailer during transport; providing pressurized water at an animal activated dispensing valve in the watering assembly located on the outside of the trailer when the trailer is parked; actuating the dispensing valve by an action of the animal; dispensing the water into a basin on the watering assembly for consumption by the animal; and, retaining the water in the basin with a splash resistant lip on the basin thereby restricting the water from splashing out of the basin.

DETAILED DESCRIPTION OF THE INVENTION

While this invention is susceptible to embodiment in many different forms, it is shown in the drawings, and will be described herein in detail, specific embodiments thereof with the understanding that the present disclosure is to be considered as an exemplification of the principles of the invention and is not to be limited to the specific embodiments described.

Figure 1:
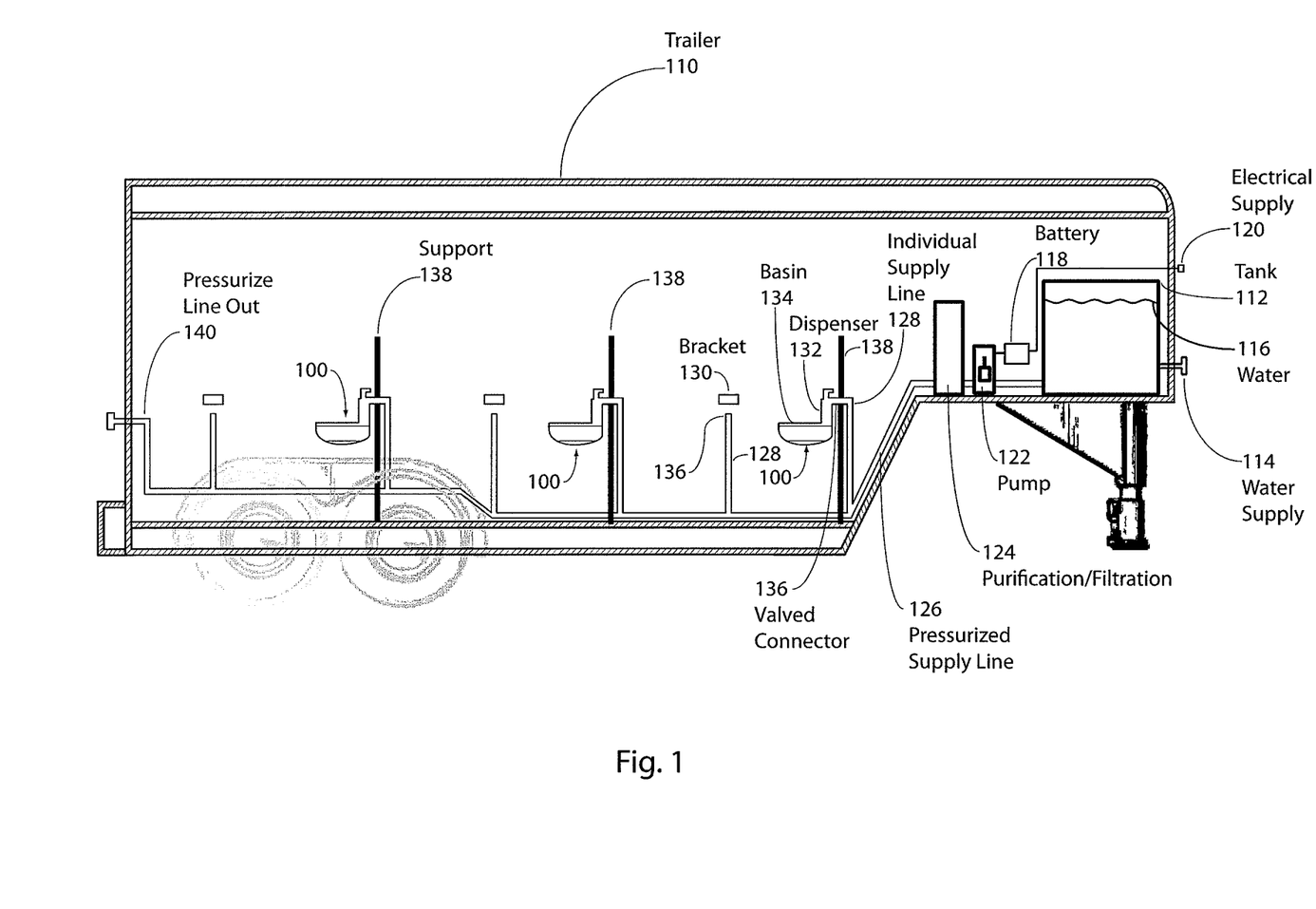
FIG. 1 illustrates an embodiment of an animal transport watering system showing multiple internal water distribution sites.

FIG. 1 illustrates an embodiment of an animal transport watering system showing multiple internal water distribution sites. This embodiment shows a lateral cut-away view of a typical 3 stall, fifth-wheel, livestock trailer 110 incorporating the on-demand watering system with the three watering assemblies 100 mounted inside of each of the animal stalls. In this embodiment, a fifth-wheel trailer 110, which is commonly used for the transport of horses, is compartmentalized into three individual stalls. Each stall is equipped with a transferable animal transport watering assembly 100. In this embodiment, each animal has their own watering assembly 100, which is releasably mounted with a quick release bracket 130 to a support 138 that facilitates easy access for the animal to drink while being transported. Providing each animal with their own watering assembly 100, limits spread of pathogens from animal to animal and eliminates cross contamination issues that arise with a communal trough.

As illustrated in FIG. 1, each watering assembly 100 is plumbed in a pressurized system with a plurality of both internal and external bracket 130 and valved connector 136 ports supplied from an on-board reservoir tank 112 which is filled with water 116. Supply water 116 is fed to a pump 122 which is driven by a battery 118 or some other type of electrical supply 120 (either within the trailer or towing vehicle) and pressurizes the distribution system through pressurized supply line 126. By utilizing a plumbed, pressurized supply to multiple distribution points, watering assemblies 100 may be placed at various points inside and/or outside the animal trailer 110. These distribution points entail a bracket 130 that readily mounts to a support 138 that may be any one of a variety of structures inside or outside of the trailer 110, such as a stall separator or gate, a wall surface, a post or the like.

The valved connector 136 allows an easy connection between a watering assembly 100 and the pressurized supply via individual supply lines 128, and will normally be accomplished using a flexible hose with a quick-connect, such as the type that is commonly used in the pneumatic tool industry. These quick-connect/quick release type valved connectors 136 allow a user to readily and swiftly change the location of a watering assembly 100 from one stall to the next or from inside the trailer (e. g., during transport) to outside the trailer (e. g., upon arrival at a performance venue where the animal will be kept for a prolonged period of time). In combination with the quick-connect/quick release type valved connectors 136, a quick-connect/quick release type of bracket 130 and hanger 131 assembly (see FIG. 4) allows a user to quickly and easily mount the watering assembly 100 almost anywhere in or on the trailer 110.

Using these types of connections, the plumbed system is pressurized at least from the pump forward to each of the individual supply lines 128 and valved connectors 136. When a watering assembly 100 is connected to the system, the pressurized water is supplied to the actuator 133 valve and may be readily and instantly dispensed into the basin 134 (detailed in FIG. 4). The pump 122 may be, for instance, a pressure actuated, 12 Volt D/C pump, that reacts to a pressure drop in the system when the livestock actuates the actuator 133 and dispenses water. Upon sensing this pressure drop, the pump 122 engages and pumps water into the pressurized supply line 126 until the pressure is back to the normal stasis point of the closed system.

As an example, a jumping horse and owner are to compete in a Hunter/Jumper horse show that is a nine-hour drive from the current location of the horse and owner. The owner utilizes the system shown by example in FIG. 1 to transport two horses to the venue. In this particular instance, two watering assemblies 100 are connected to the two front most distribution points within the individual stalls inside the trailer 110. The third distribution point is not needed, as is the case with the external distribution points, all of which are left empty. Water is dispensed from the supply tank 112 through pump 122 and optional purification/filtration unit 124 to individual supply lines 128 via pressurized supply line 126 to the watering assemblies 100. In the watering assemblies 100, water is dispensed by a dispenser 132 and accumulated in a basin 134 which is directly accessible to each horse occupying the front two stalls. In this manner, a horse may actuate a demand valve (actuator 133 see FIG. 4) to dispense water on-demand and throughout the trip, instead of, either periodically stopping to water the animals, or placing a bucket, that is likely to spill, within the trailer. Upon arrival to the performance venue, the trailer is parked and the two watering assemblies 100 are easily disconnected from the internal mounting points and transferred to two of the external distribution points (see FIG. 2) where the horses may access water during their stay. In this manner, the horses arrive well hydrated, in top condition to compete, and undergo much less transport stress than they would without the animal transport watering system.

Once the trailer is parked, an external source of water may be supplied via water supply 114 and may also be kept in place with the supply pressure being used to drive the system pressure instead of the pump 122. Similarly the electrical supply may be augmented, replaced or supplemented by an external source input through electrical supply 120. For additional watering needs, a pressurized line out 140 may be used in combination with a manual valve and a standard hose connection to supply pressurized water for washing or other uses when the trailer is on-site.

Figure 2:
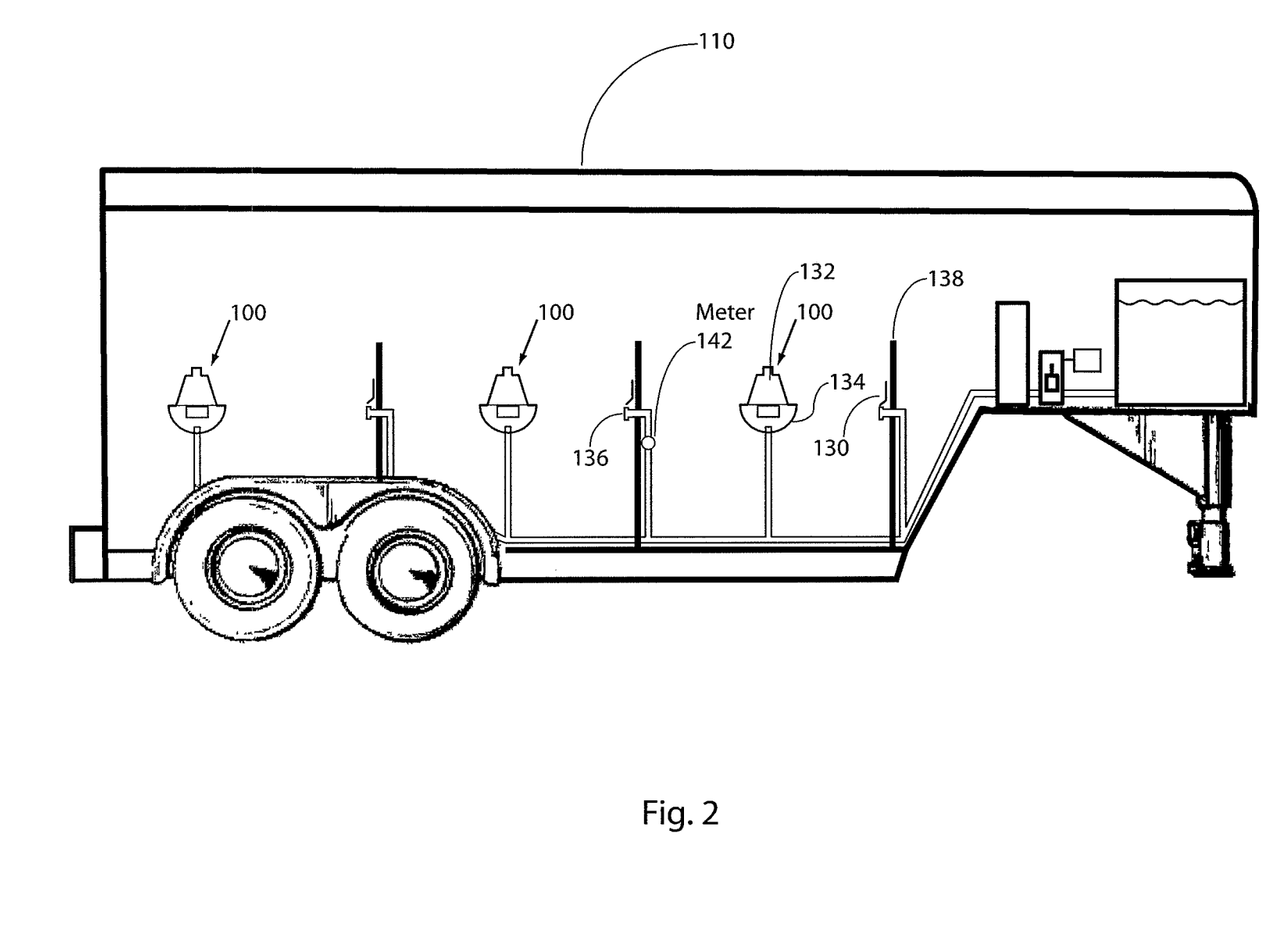
FIG. 2 illustrates an embodiment of an animal transport watering system showing multiple external water distribution sites.

The embodiment illustrated in FIG. 2 shows an animal transport watering system depicting multiple external water distribution sites. This embodiment shows a lateral cut-away view of a typical 3 stall, fifth-wheel, livestock trailer 110 (Shown in FIG. 1) incorporating the on-demand watering system with three watering assemblies 100 mounted outside of the trailer. When configured in this manner, watering assemblies 100 are easily disconnected from the internal mounting points as shown in FIG. 1, and transferred to the external distribution points for easy access to water when the trailer is parked.

FIG. 2 also shows an optional flow meter 142 for monitoring the amount of water that flows within the system or to any of the individual distribution sites. In this way, one may monitor the amount of water that an individual animal has dispensed during a trip. This information may be very valuable to an owner transporting expensive animals with the expectation that they will need to be in their best physical condition upon arrival.

Figure 3:
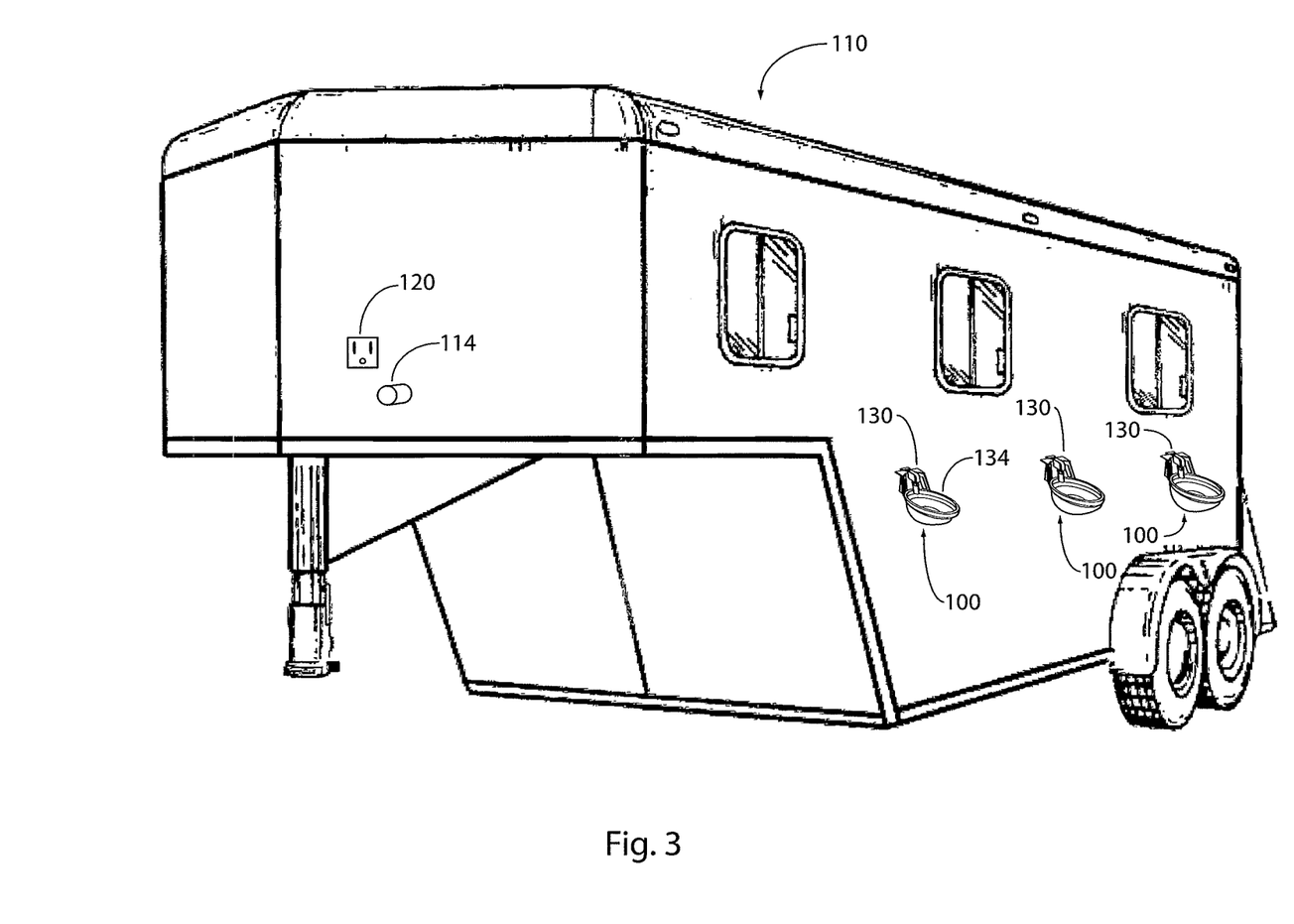
FIG. 3 illustrates another view of an embodiment of an animal transport watering system showing multiple external water distribution sites.

FIG. 3 illustrates an additional view of an embodiment of an animal transport watering system showing multiple external water distribution sites. This embodiment shows an isometric view of the typical 3 stall, fifth-wheel, livestock trailer 110 shown in FIG. 1, incorporating the on-demand watering system with three watering assemblies 100 mounted on the side of the trailer 110. In this embodiment, one or more watering assemblies 100 are releasably mounted with a quick release bracket 130 to a support, which in this case, is the external wall of the trailer 110, and which facilitates easy access for the animal to drink from the basin 134 before or after being transported. In this configuration, animals can either be tied to the trailer on a lead, corralled around the trailer, or be allowed to roam free within the vicinity of the trailer 110 and still have ample access to a fresh water supply. This is particularly helpful during horse shows and other equestrian competitions such as racing, dressage, jumping, rodeo, polo, mounted shooting or the like where space and facilities are limited and stock needs are paramount.

FIG. 3 also shows the optional inlet ports of both the water supply 114 and the electrical supply 120, which can be used to provide a nearly limitless supply of water and electricity to the trailer 110 when connected to an outside source. Provided that the area where the trailer 110 is parked has access to standard A/C electrical supply and a common water hose, the trailer 110 may be used indefinitely to provide water and shelter to animals. A common converter (not shown) can also be incorporated within the electrical system to provide universal conversion of A/C or D/C supply to the current needed to charge the battery 118 or to bypass the battery and directly drive the pump 122 and/or the purification/filtration unit 124.

This purification/filtration unit 124 may be a mechanical filtration that mechanically or chemically removes sediment or impurities from the water such as activated carbon, zeolite, membrane filtration, fiber filtration, mechanical sieving, ion exchange, or chemical dosing, or it may also be a disinfecting system or any combination of the above. For example, the purification/filtration unit 124 may be a reverse osmosis, distillation, ultraviolet disinfection system or the like thereby providing the added benefit of supplying purified water to the animals before, during or after transport.

Figure 4:
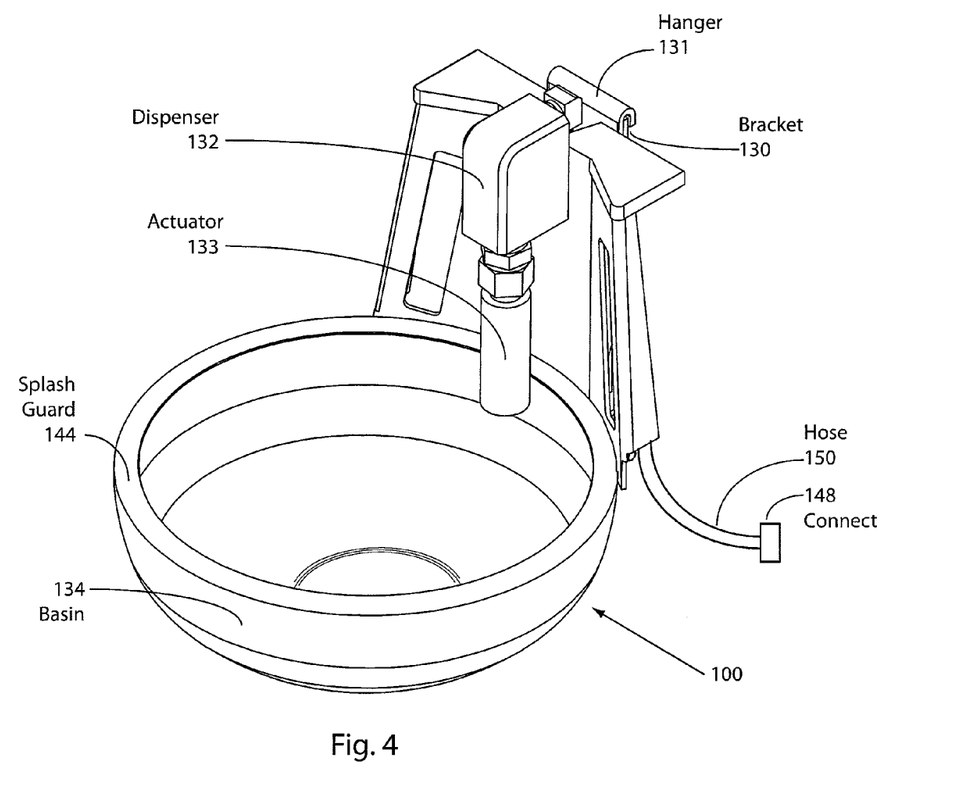
FIG. 4 illustrates an embodiment of a transferable animal transport watering assembly.

FIG. 4 illustrates an embodiment of a transferable animal transport watering assembly 100. In this embodiment, a supply hose 150 with a connector 148 attached to the supply end provides pressurized water to the dispenser 132 controlled by a valve actuator 133. On one embodiment, the actuator 133 is a demand valve that is actuated by mechanical pressure exerted by the animal. As shown in FIG. 4, the actuator 133 is displaced from its resting (closed) position shown, by the nose or muzzle of the animal. This displacement releases the flow of pressurized water in the system into the basin 134 where the animal may drink. This on-demand actuation action is easily learned and understood by the animal that quickly associates pressing their muzzle into the basin with self-dispense drinking water.

The embodiment shown in FIG. 4 also illustrates the bracket 130 which is temporarily, permanently or releasably mounted to a support structure 138 typically with the use of fasteners (e.g., screws, bolts, pins, rivets, and the like). Once mounted on a support 138, the bracket 130 is engaged and releasably secures the watering assembly 100 by a hanger 131 which allows a secure fastening of the assembly, and facilitates a quick release when one desires to change the location or remove the waterer.

As one can readily see, the embodiment shown in FIG. 4 allows the animal being transported to self administer the water using the actuator 150. In this particular example, the animal actuated demand valve allows the horse, cow, pig, sheep, other ruminant or the like to use their muzzle, nose tongue or other body part to affect displacement of the actuator 150, thereby causing water to flow out of the dispenser 132 and collect in the basin 134. Although a mechanically actuated demand valve is depicted in FIG. 4, it is also contemplated that other forms of actuation may be utilized, such as electronically actuated (optical, thermal/IR, inductance etc.) or the like. In this way, the amount of water dispensed into the basin 134 is limited to the amount that the animal desires at that moment, thereby reducing waste and water contamination and stagnation. Since the aforementioned system allows each animal to have their own pressurized watering assembly 100, the likelihood of cross contamination, or spread of water transmitted infection and disease from animal to animal is minimized.

Figure 5:
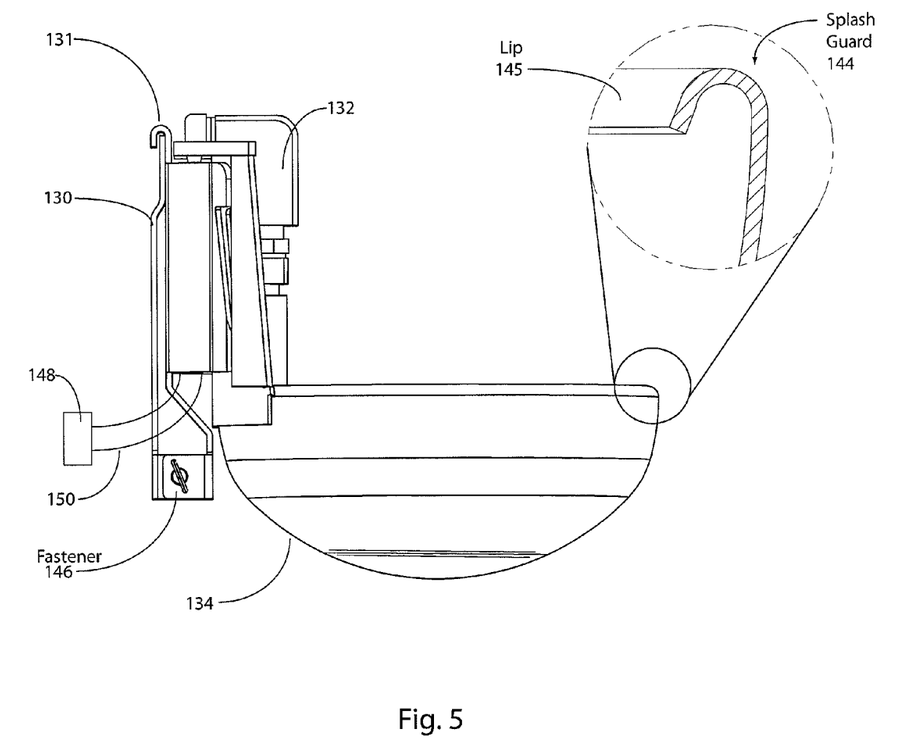
FIG. 5 illustrates an embodiment of a transferable animal transport watering assembly with splash-resistant basin.

FIG. 5 illustrates an embodiment of a transferable animal transport watering assembly with a splash-resistant basin. In this embodiment, the basin 134, which in this example is roughly a semi hemispherical shell (bowl), has been adapted with a splash-guard 144 that acts to direct liquid that has been imparted with enough force to spill over the upper rim of the bowl, to return within the confines of the basin. In this instance, the upper rim of the basin is curved inward and downward forming a lip 145 to limit or prevent the liquid from splashing on the floor of the trailer 110 while subjected to the motions of towing. This splash guard 144, combined with the on-demand, self actuated watering assembly 100, with a small volume basin 134, act to limit or eliminate water waste in the system.

Figure 6:
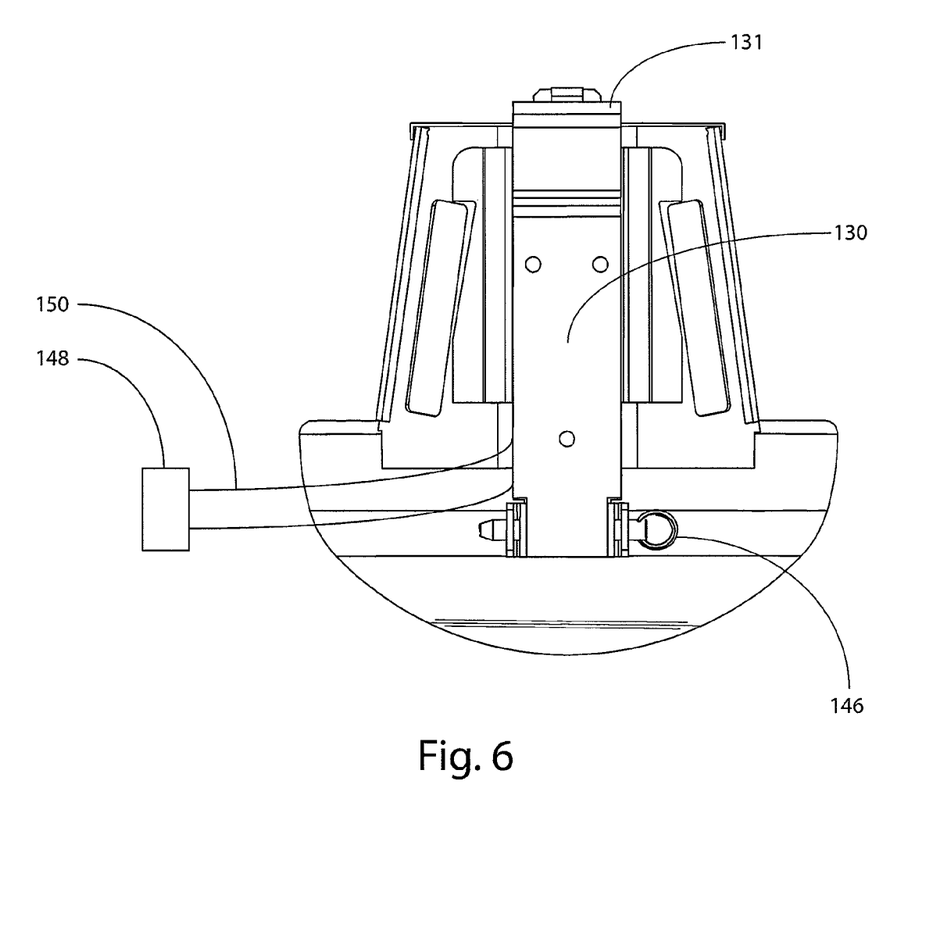
FIG. 6 illustrates an embodiment of a transferable animal transport watering assembly with quick disconnect bracket and pressurized water supply.

FIG. 6 illustrates an embodiment showing a rear view of a transferable animal transport watering assembly 100 with a quick-disconnect bracket 130 and pressurized water supply. In this embodiment, the bracket 130 is shown with access holes for fasteners to be mounted on a support 138. In this example, the watering assembly 100 is then secured to the bracket 130 on the upper portion using a hanger 131 and releasably secured on the lower portion by a fastener 146. In this example, the fastener 146 is a ringed cotter pin that is inserted through the bracket 130 and the watering assembly 100 with a keyed interference fit pin. In this manner, the pin can quickly and easily be removed, allowing swift and easy removal of the watering assembly 100 from the bracket 130. This mechanism, combined with a quick-connect/quick-release valved water line, allows one to readily switch the watering assemblies 100 from one stall to another or from inside points to outside points on the trailer 110.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The embodiments of the invention in which an exclusive property or privilege is claimed are defined as follows:

1. A method of providing water to livestock transported in a trailer that can be towed behind a vehicle comprising:
   transporting livestock within a trailer comprising at least one animal stall capable of housing at least one animal;
   storing water for livestock consumption within a liquid reservoir;
   pumping said water from said liquid reservoir through a pressurized water distribution network to a plurality of water distribution sites located inside and outside of said trailer via a plurality of individual supply lines;
   providing releasable valved connections at a distal terminus of each of said plurality of individual supply lines,
   allowing flow of said water through said releasable valved connection to a watering assembly when said watering assembly is connected to said releasable valved connection, and preventing flow of said water through said releasable valved connection when said watering assembly is not connected to said releasable valved connection;
   said watering assembly comprising:
      a connector facilitating a pressurized connection between the releasable valve connection and each said individual supply line, said supply line in fluid communication with an animal activated dispensing valve;
      a basin comprising a splash resistant lip;
      a hanger;
      wherein connecting said watering assembly to at least one said releasable valved connections at one of said plurality of water distribution sites with a hanger that facilitates a releasable connection between said watering assembly and a first bracket mounted on an internal support structure located within the confines of said trailer;

transporting said livestock and said liquid reservoir filled with said water with said trailer;

connecting, said watering assembly to at least one of said releasable valved connections at one of said plurality of water distribution sites located outside of the confines of said trailer with said hanger that facilitates a releasable connection between said watering assembly and a second bracket mounted on an external support structure associated with said trailer;

providing pressurized said water at an animal activated dispensing valve in said watering assembly located within said trailer during said transport;

providing pressurized said water at an animal activated dispensing valve in said watering assembly located on the outside of said trailer when said trailer is parked;

wherein actuating said animal activated dispensing valve by said animal dispenses water into said basin for consumption by said animal; and said water is retained in said basin with said splash resistant lip on said basin thereby restricting said water from splashing out of said basin.

2. The method of claim 1 further comprising:
removing impurities from said water with a filter.

3. The method of claim 1 further comprising:
disinfecting biological contaminants in said water.

4. The method of claim 1 further comprising:
metering flow of water passing at a point within the system.

5. The method of claim 1 further comprising:
sensing the pressure downstream of said pump; and,
actuating said pump until said downstream pressure reaches a preset value.

* * * * *